(12) United States Patent
Davis et al.

(10) Patent No.: US 11,780,179 B2
(45) Date of Patent: Oct. 10, 2023

(54) THERMOPLASTIC COMPOSITE PANEL WITH CORRUGATED PEAKS AND TROUGHS STIFFENING SYSTEMS AND METHODS

(71) Applicant: ROHR, INC., Chula Vista, CA (US)

(72) Inventors: Jennifer Davis, La Jolla, CA (US); Nathaniel M. Gray, Stratham, NH (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/464,997

(22) Filed: Sep. 2, 2021

(65) Prior Publication Data

US 2023/0060367 A1   Mar. 2, 2023

(51) Int. Cl.
| | |
|---|---|
| *B29C 70/46* | (2006.01) |
| *B29C 70/38* | (2006.01) |
| *B29C 51/10* | (2006.01) |
| *B29C 51/12* | (2006.01) |
| *B29C 51/14* | (2006.01) |
| *B29C 65/02* | (2006.01) |
| *B29D 99/00* | (2010.01) |

(52) U.S. Cl.
CPC ............ *B29C 70/382* (2013.01); *B29C 51/105* (2013.01); *B29C 51/12* (2013.01); *B29C 51/14* (2013.01); *B29C 65/022* (2013.01); *B29C 70/46* (2013.01); *B29D 99/0014* (2013.01)

(58) Field of Classification Search
CPC .............................. B29C 70/46; B29C 70/382
See application file for complete search history.

(56) References Cited

U.S. PATENT DOCUMENTS

| | | | |
|---|---|---|---|
| 3,658,612 A | * | 4/1972 | Corzine .................. B32B 5/18 156/93 |
| 5,399,215 A | | 3/1995 | Blot et al. |
| 5,462,408 A | * | 10/1995 | Coffy .................... B29B 15/08 264/261 |

(Continued)

FOREIGN PATENT DOCUMENTS

| | | |
|---|---|---|
| DE | 102011076082 A1 | 11/2012 |
| EP | 2833356 A2 | 2/2015 |

(Continued)

OTHER PUBLICATIONS

Chen, L. et al., Compressive response of multi-layered thermoplastic composite corrugated sandwich panels: Modelling and experiments, Composite Part B 189 (2020), 8 Pages, (Year: 2020).

(Continued)

*Primary Examiner* — Matthew J Daniels
(74) *Attorney, Agent, or Firm* — SNELL & WILMER L.L.P.

(57) ABSTRACT

A method for forming a fiber-reinforced thermoplastic control surface may comprise: stacking plies of thermoplastic composite sheets to a first desired thickness to form a first skin; stacking plies of thermoplastic composite sheets to a second desired thickness to form a second skin; forming the first skin in a first contour; forming the second skin in a second contour; forming a stiffening member including a thermoplastic resin, the stiffening member including a shape having a plurality of peaks and troughs; assembling the stiffening member between the first skin and the second skin; and joining the stiffening member to the first skin and the second skin.

15 Claims, 6 Drawing Sheets

(56) References Cited

U.S. PATENT DOCUMENTS

| | | | |
|---|---|---|---|
| 6,632,502 B1 | 10/2003 | Allen et al. | |
| 6,713,008 B1* | 3/2004 | Teeter ................ | B29C 70/025 |
| | | | 264/258 |
| 8,245,971 B2 | 8/2012 | Makela et al. | |
| 8,292,227 B2 | 10/2012 | Stuhr et al. | |
| 8,377,247 B2 | 2/2013 | Guzman et al. | |
| 9,358,764 B2 | 6/2016 | Prebil et al. | |
| 9,610,756 B2 | 4/2017 | Ashton et al. | |
| 9,764,818 B2 | 9/2017 | Nampy et al. | |
| 9,783,289 B2 | 10/2017 | Lee et al. | |
| 10,232,926 B2 | 3/2019 | Goehlich | |
| 10,556,670 B2 | 2/2020 | Koppelman et al. | |
| 10,933,595 B2 | 3/2021 | Matsumoto et al. | |
| 2003/0089824 A1 | 5/2003 | Stemberger | |
| 2016/0257396 A1* | 9/2016 | Cawthorne et al. .. | B29C 66/474 |
| 2018/0229829 A1 | 8/2018 | Pierick et al. | |
| 2019/0153993 A1 | 5/2019 | Tobin et al. | |
| 2019/0283856 A1 | 9/2019 | Clapp et al. | |
| 2020/0010175 A1 | 1/2020 | Sanz Martinez et al. | |
| 2020/0095955 A1 | 3/2020 | Davis | |
| 2020/0307756 A1 | 10/2020 | Periyasamy et al. | |
| 2020/0353667 A1 | 11/2020 | Davis | |
| 2021/0039349 A1 | 2/2021 | Gurvich et al. | |

FOREIGN PATENT DOCUMENTS

| | | |
|---|---|---|
| EP | 3643471 A1 | 4/2020 |
| EP | 3858584 A1 | 8/2021 |
| FR | 2559422 A1* | 8/1985 |

OTHER PUBLICATIONS

European Patent Office, European Search Report dated Jan. 20, 2023 in Application No. 22193485.4.

European Patent Office, European Search Report dated Jan. 26, 2023 in Application No. 22193452.4.

European Patent Office, European Search Report dated Jan. 30, 2023 in Application No. 22193787.3.

Hu, J. et al., Novel panel-core connection process and impact behaviors of CF/PEEK thermoplastic composite sandwich structures with truss cores, Composite Structures, Vol. 251 (2020), 16 pages. (Year: 2020).*

Machine Translation of FR2559422 to Murphy et al, Feb. 1985, 12 pages. (Year: 1986).*

USPTO; Non-Final Office action dated Feb. 7, 2023 in U.S. Appl. No. 17/465,027.

USPTO; Restriction/Election Requirement dated Jun. 14, 2022 in U.S. Appl. No. 17/465,027.

* cited by examiner

THERMOPLASTIC COMPOSITE PANEL WITH CORRUGATED PEAKS AND TROUGHS STIFFENING SYSTEMS AND METHODS

FIELD

The present disclosure relates generally to systems and methods for forming thermoplastic composite panels, and more specifically to systems and methods for forming thermoplastic composite flight control and high lift surfaces for aircraft.

BACKGROUND

Aircraft are typically equipped with control surfaces to maneuver the aircraft during flight as well as high lift surfaces to increase lift at low airspeed. The control surfaces are typically hingedly attached to wings, horizontal stabilizers, and/or vertical stabilizers. The horizontal and vertical stabilizers are collectively referred to as the empennage. As the control surfaces are rotated with respect to the wings or empennage, air flow is deflected and causes the attitude and/or flight path of the aircraft to change. Based on the locations and relative rotation directions of the control surfaces, the aircraft may slow, ascend, descend, roll, and/or turn.

SUMMARY

A method for forming a fiber-reinforced thermoplastic control surface is disclosed herein. The method may comprise: stacking plies of thermoplastic composite sheets to a first desired thickness to form a first skin; stacking plies of thermoplastic composite sheets to a second desired thickness to form a second skin; forming the first skin in a first contour; forming the second skin in a second contour; forming a stiffening member including a thermoplastic resin, the stiffening member including a shape having a plurality of peaks and troughs; assembling the stiffening member between the first skin and the second skin; and joining the stiffening member to the first skin and the second skin.

In various embodiments, forming the first skin, forming the second skin, and forming the stiffening member may each be performed via stamp forming. Forming the first skin, forming the second skin, and forming the stiffening member may each be performed via twin sheet forming. Forming the first skin, forming the second skin, and forming the stiffening member may each be performed via automated fiber placement. The plurality of peaks may be joined to and mate with the first skin, and the plurality of troughs may mate with and be joined to the second skin. The outer surface may define a structure of an aircraft component. The first skin may include an outer surface that defines a control surface, and the second skin may include an inner surface at least partially defining a hollow chamber of an airfoil.

A method for forming a fiber-reinforced thermoplastic control surface is disclosed herein. The method may comprise: forming a combined first skin and first stiffening member by joining a first skin to a plurality of peaks of the first stiffening member; forming a combined second skin and second stiffening member by joining a second skin to a plurality of troughs of a second stiffening member; and bonding the combined first skin and first stiffening member to the combined second skin and stiffening member.

In various embodiments, bonding the combined first skin and stiffening member and the combined second skin and second stiffening member includes bonding the first stiffening member to the second stiffening member. The first stiffening member and the second stiffening member may be bonded along a contour of the first stiffening member and the second stiffening member. Forming the combined first skin and first stiffening member and forming the combined second skin and second stiffening member may each comprise stamp forming. Forming the combined first skin and first stiffening member and forming the combined second skin and second stiffening member may each comprise twin sheet forming. The method may further comprise stacking plies of thermoplastic composite sheets to a first desired thickness to form the first skin and stacking plies of thermoplastic composite sheets to a second desired thickness to form the second skin. Joining may include consolidation and cooling. Joining may otherwise include welding.

A control surface for an aircraft is disclosed herein. The control surface may comprise: a first skin having an outer surface configured to receive an aerodynamic flow; a second skin; and a stiffening member disposed between the first skin and the second skin, the stiffening member comprising a contour having a plurality of peaks and a plurality of troughs, the plurality of peaks being bonded to the first skin and the plurality of troughs being bonded to the second skin.

In various embodiments, the second skin may include an inner surface at least partially defining a hollow chamber of the airfoil. The hollow chamber may extend spanwise in the airfoil. The first skin, the second skin, and the stiffening member may form a monolithic component. The first skin, the second skin, and the stiffening member form a monolithic component.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In general, the example control surfaces described herein may be used with aircraft wings, stabilizers, or elevators, among other aerodynamic surfaces of an aircraft. Some examples of common names for these surfaces known to those practiced in the arts include but are not limited to flaps, ailerons, rudders, elevators, stabilators, elevons, spoilers, lift dumpers, speed brakes, airbrakes, trim tabs, slats, flaperons, spoilerons, and canards. These are henceforth referred to as control surfaces. In general, control surfaces may direct air flow during maneuvering and in-flight aircraft attitude adjustments. The example control surfaces described herein may be lighter weight and cheaper to manufacture relative to typical control surfaces. Thus, the example control surfaces described herein provide increased fuel efficiency and/or range to aircraft. Still further, the example control surfaces may be manufactured using an automated skin/stiffener manufacturing process, as described herein, which optimizes material usage and reduces cycle time.

A control surface, as described herein, includes a structural body comprising core stiffener structures and skin members, wherein the core stiffener structures are sandwiched by the skin members. In various embodiments, the skin members include a continuous fiber reinforced fabric and a thermoplastic resin. In various embodiments, the stiffener structures include a continuous or discontinuous fiber reinforced fabric and a thermoplastic resin. The reinforcing fiber to be used for the control surface has no particular limitations with respect to the type thereof, and examples thereof include metal fibers, such as an aluminum fiber, a brass fiber, and a copper fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for the control surface may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR). The thermoplastic resin to be used for the control surface also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

In various embodiments, the control surface of the present disclosure may be formed by stamp forming the stiffener structure into a corrugated shape, stamp forming each of a first skin and a second skin, and coupling the stiffener structure to both skins, and subsequently welding (or appropriate method of joining) the skin members together to form the control surface.

In various embodiments, the methods of manufacturing disclosed herein may provide an alternative to typical core manufacturing that may be significantly cheaper, quicker, more light weight, while still combating skin buckling. The methods of manufacturing disclosed herein may be automated, result in minimal manufacturing steps, reduction in assembly and tooling, include precise tolerances, and eliminate support tooling during bonding.

Figures 1A, 1B:
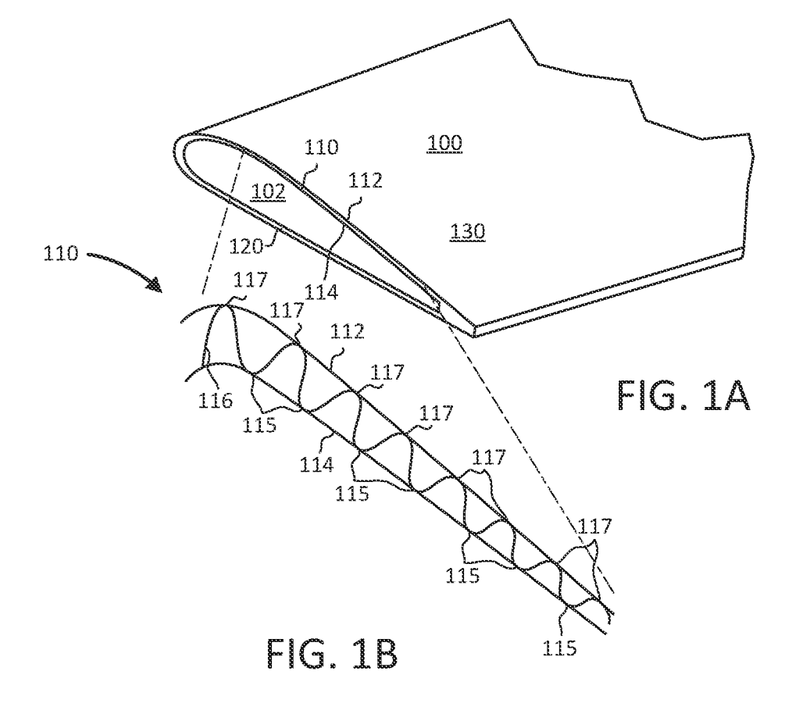
FIG. 1A illustrates an isometric view of an exemplary control surface, in accordance with various embodiments.
FIG. 1B illustrates a view of a stiffened structure for a control surface, in accordance with various embodiments.

With combined reference to FIG. 1A, a portion of a perspective cross sectional view of a control surface 100 is illustrated in accordance with various embodiments. In various embodiments, the control surface 100 comprises a first stiffened structure 110 and a second stiffened structure 120. The first stiffened structure 110 and the second stiffened structure 120 may define an outer airfoil surface 130. Although illustrated as including two stiffened structures 110, 120, any number of stiffened structures may be utilized to form the airfoil surface 130 of the control surface 100 in accordance with various embodiments. In various embodiments, a hollow chamber 102 may be disposed between the first stiffened structure 110 and the second stiffened structure 120. In this regard, the stiffened structures 110, 120 may each include a stiffening member disposed therein configured to provide sufficient strength for the control surface 100 to prevent skin buckling, in accordance with various embodiments.

Referring now to FIG. 1B, the first stiffened structure 110 is illustrated, in accordance with various embodiments. In various embodiments, the second stiffened structure 120 may be in accordance with the first stiffened structure 110. The stiffened structure 110 comprises a first skin 112, a second skin 114, and a stiffening member 116 disposed between the first skin 112 and the second skin 114. In various embodiments, an outer surface of the first skin 112 defines the outer airfoil surface 130 and an inner surface of the first skin 122 mates with, and is coupled to, a plurality of peaks 117 of the stiffening member 116 as described further herein.

In various embodiments, an inner surface of the second skin 114 at least partially defines the hollow chamber 102. The outer surface of the second skin 114 mates with, and is coupled to, a plurality of troughs 115 of the stiffening member 116 as described further herein. In this regard, the stiffened structure 110 comprises a sandwich construction. A sandwich construction, as disclosed herein, refers to one or more high-strength outer layers and one or more low-density inner layers (i.e., a core). In various embodiments, the plurality of troughs 115 may be coupled to the second skin 114 by any method of joining, such as welding, brazing, or bonding via heating and consolidation as described further herein. Similarly, the plurality of peaks may be coupled to the first skin 112 by any method of joining, such as welding, brazing, or bonding via heating and consolidation as described further herein. In various embodiments, the stiffened structure 110 is a monolithic component (i.e., formed of a single piece) via the methods disclosed further herein.

Figure 2:
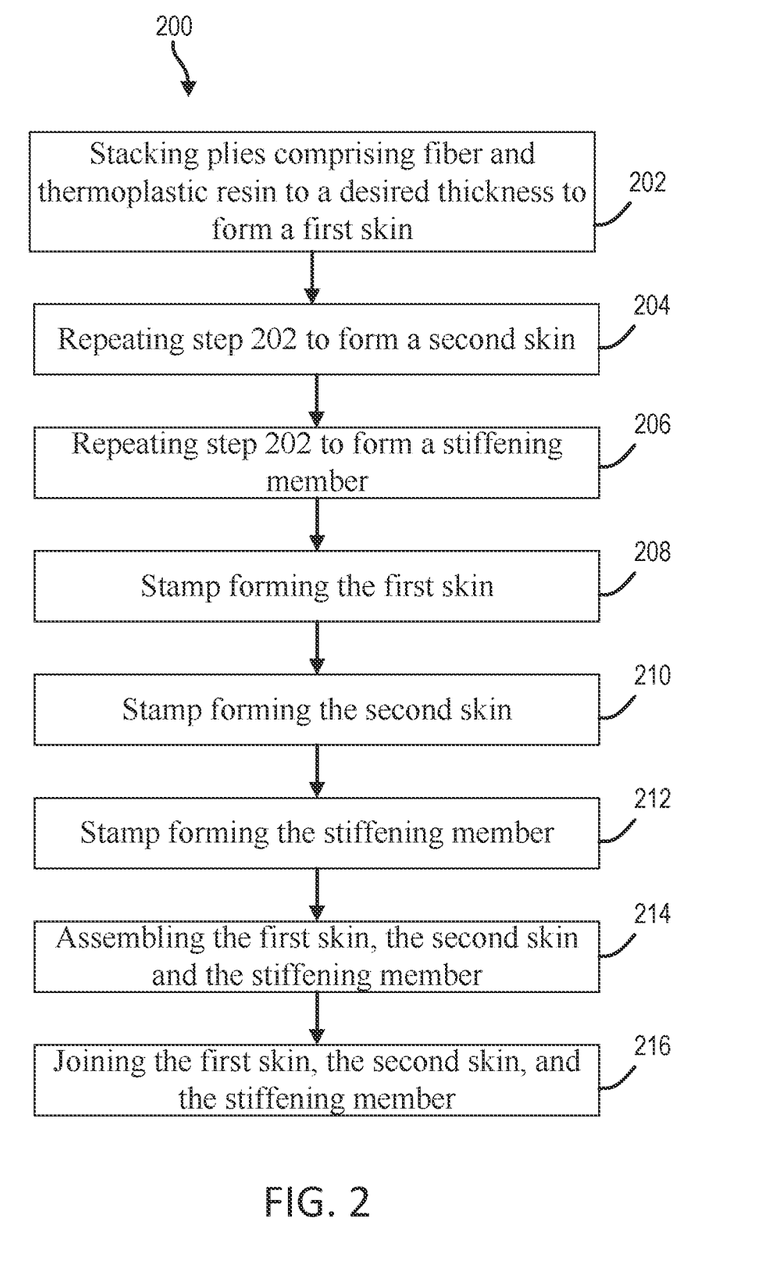
FIG. 2 illustrates a method of forming a stiffened structure for a control surface, in accordance with various embodiments.

With reference to FIG. 2, a method 200 for manufacturing a control surface is provided, in accordance with various embodiments. Method 200 includes stacking plies comprising fiber and thermoplastic resin to a desired thickness to form a first skin (step 202). Method 200 includes repeating step 202 to form a second skin (step 204) and repeating step 202 to form a stiffening member (step 206). In various embodiments, step 206 may include utilizing only a single ply of a thermoplastic resin for thin stiffening member applications.

Method 200 includes stamp forming the first skin (step 208). "Stamp forming" as disclosed herein refers to a variation of compression molding that is similar to sheet metal forming process. Stamp forming may utilize a compression molding press and a matched pair of molds. A stack of plies of material are heated and positioned between the two halves. Method 200 includes stamp forming the second skin (step 210). Method 200 includes stamp forming the stiffening member (step 212). Method 200 includes assembling the first skin, the second skin, and the stiffening member (step 214). Assembling the first skin, the second skin, and the stiffening member may occur while the first skin, the second skin, and the stiffening member are in a heated state. Method 200 includes bonding or otherwise joining the first skin, the second skin, and the stiffening member together to form a stiffened structure (e.g., stiffened structure 110, 120 from FIG. 1B).

Figure 3A:
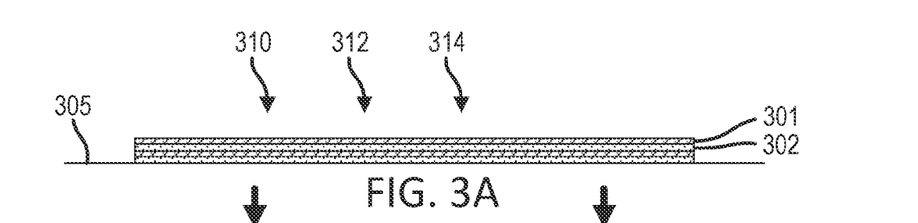
FIG. 3A illustrates forming a skin in accordance with the method from FIG. 2, in accordance with various embodiments.

With combined reference to FIGS. 2 and 3A, step 202 may include stacking plies of fiber-reinforced thermoplastic sheets 301 and fiber-reinforced thermoplastic sheets 302 to a desired thickness to form a first skin 310 (e.g., stacking the sheets 301, 302 in alternating relation). In various embodiments, and for ease of handling, the sheets may be stacked on a flat surface 305. In various embodiments, sheets 301 comprise fiber sheets pre-impregnated with a thermoplastic resin. However, it is contemplated that various types of fiber and/or thermoplastic resin sheets may be used to form first skin 310. For example, the sheets may comprise pre-impregnated fibers, separate sheets of fiber and resin, fiber sheets impregnated on demand during the stacking process, among others. The sheets 301, 302 may be tacked together during the stacking process to prevent/reduce the potential of deconsolidation in response to the first skin 310 being moved to a stamp forming tool.

With combined reference to FIG. 2 and FIG. 3A, step 204 may include repeating step 202 to form a second skin 312.

With combined reference to FIG. 2 and FIG. 3A, step 206 may include repeating step 202 to form a stiffening member 314.

Figure 3B:
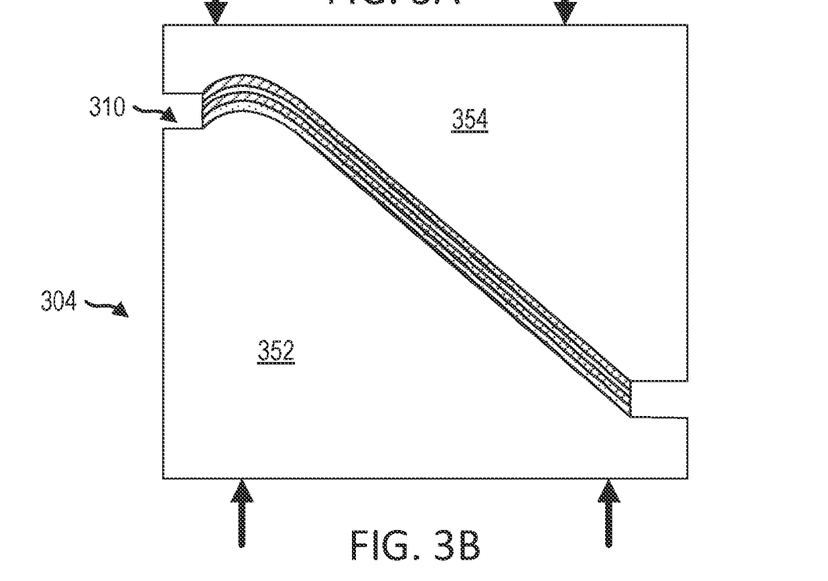
FIG. 3B illustrates forming a skin in accordance with the method from FIG. 2, in accordance with various embodiments.

With combined reference to FIG. 2 and FIG. 3B, step 208 may include transferring the stack of plies for the first skin 310 to a stamp forming tool 304 and stamp forming the first skin 310 via the stamp forming tool 304. The plies for the first skin 310 may be transferred to stamp forming tool 304 by hand or using an automated process. The stamp forming tool 304 may be configured to heat the first skin 310 (e.g., via convective heating, conductive heating, inductive heating, etc.) and compressing the stamp forming tool 304. The stamp forming tool 304 may comprise a first mold 352 and a second mold 354 corresponding to an inner surface and an outer surface of the first skin 310. In this regard, the stamp forming may compress the first skin 310 to form a desired skin shape (i.e., a control surface shape), in accordance with various embodiments.

With combined reference to FIG. 2 and FIG. 3B, step 210 may include transferring the stack of plies for the second skin 312 to a stamp forming tool and stamp forming the second skin 312 via the stamp forming tool. The second skin 312 may be stamp formed in accordance with the first skin 310 as outlined previously herein. The stamp forming tool may include a complimentary shape to the second skin 312.

With combined reference to FIG. 2 and FIG. 3B, step 212 may include transferring the stack of plies for the stiffening member 314 to a stamp forming tool and stamp forming the stiffening member 314 via the stamp forming tool. The stiffening member 314 may be stamp formed in accordance with the first skin 310 as outlined previously herein. The stamp forming tool for the stiffening member 314 may include a complimentary shape to the stiffening member 316 shown in FIG. 3C.

Figure 3C:
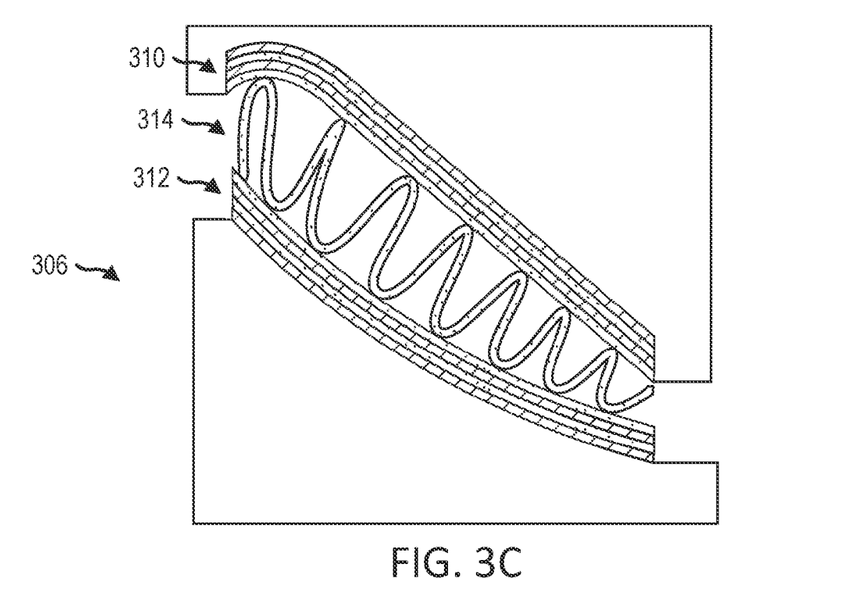
FIG. 3C illustrates forming a stiffened structure in accordance with the method from FIG. 2, in accordance with various embodiments.

With combined reference to FIG. 2 and FIG. 3C, step 214 may include assembling the first skin 310, the second skin 312 and the stiffening member 314 as shown within a consolidation tool 306. In this regard, the stiffening member 314 may be disposed between the first skin 310 and the second skin 312. The first skin 310, the second skin 312, and the stiffening member 314 may remain in a heated state from the stamp forming steps 208, 210, 212. In various embodiments, assembly of the first skin 310, the second skin 312, and the stiffening member 314 may include tacking together peaks of the stiffening member 314 to the first skin 310 and tacking troughs of the stiffening member 314 to the second skin 312 to prevent/reduce the potential of deconsolidation as disclosed previously herein.

With combined reference to FIG. 2 and FIG. 3C, step 216 may include bonding (or otherwise joining) the first skin 310, the second skin 312, and the stiffening member 314 to form a stiffened structure (e.g., stiffened structure 110, 120 from FIG. 1). In this regard, the first skin 310, the second skin 312, and the stiffening member 314 may consolidate via cooling, in accordance with various embodiments. In various embodiments, cooling may be passive or active. The method 200 may further comprise removing the resultant stiffened structure from the consolidation tool 306.

Figure 4:
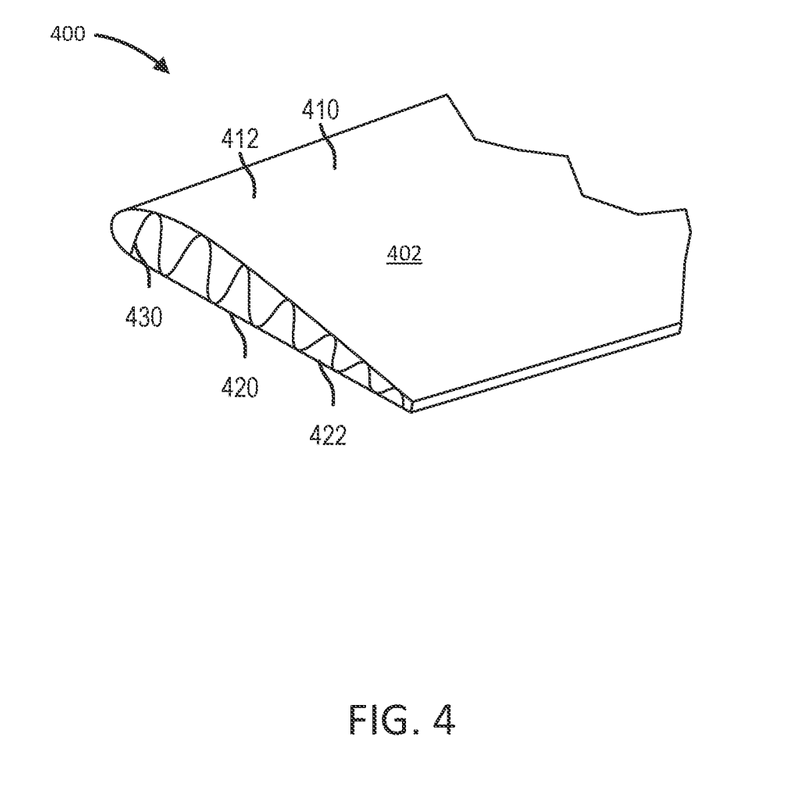
FIG. 4 illustrates a view of a stiffened structure for a control surface, in accordance with various embodiments.

Referring now to FIG. 4, a stiffened structure 400 formed in a similar manner (e.g., in accordance with method 200) to form the stiffened structure 110 from FIG. 1A is illustrated in accordance with various embodiments. In various embodiments, a first skin 412 of the stiffened structure 400 manufactured in accordance with method 200 may correspond to a suction side surface 410 of a control surface 402 and the second skin 422 of the stiffened structure 400 manufactured in accordance with method 200 may correspond to a pressure side surface 420 of the control surface 402. In this regard, a stiffening member 430 may be disposed in the hollow chamber 102 from FIG. 1B as opposed to between an inner wall and an outer wall in accordance with stiffened structure 110, 120 from FIG. 1B. In this regard, the first skin 412 and the second skin 422 may be significantly thinner relative to a first skin and a second skin of the stiffened structure 110 from FIG. 1. Similarly, the stiffening member 430 may be significantly thicker relative to the stiffening member 116 of the stiffened structure 110 from FIG. 1B.

Although described herein as comprising stamp forming steps 208, 210, 212 the present disclosure is not limited in this regard. For example, twin sheet forming or automated fiber placement ("AFP") may be utilized for a top skin (e.g., first skin 412 or first skin 112) and the stiffening member (e.g., stiffening member 430 or stiffening member 116), or the bottom skin (e.g., second skin 422 or second skin 114), in accordance with various embodiments.

Figure 5:
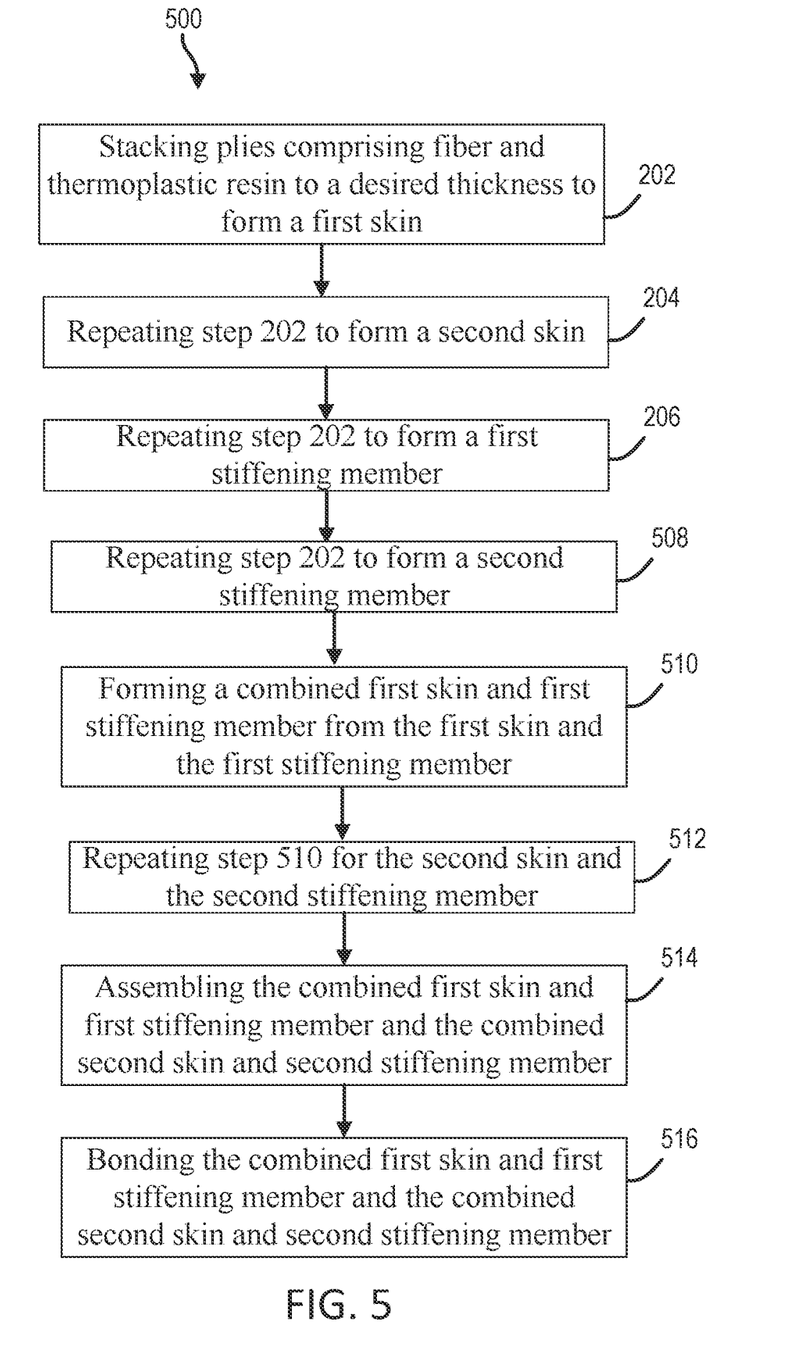
FIG. 5 illustrates a method of forming a stiffened structure for a control surface, in accordance with various embodiments.

Referring now to FIG. 5, a method 500 of forming a stiffened structure 110, 120, 400 is illustrated, in accordance with various embodiments. Steps 202, 204, and 206 of method 200 may be repeated. The method 500 may further comprise repeating step 202 to form a second stiffening member (step 508). The second stiffening member may have a similar contour to a first stiffening member of step 206. The method 500 further includes forming a combined first skin and first stiffening member from the first skin and the first stiffening member (step 510). The combined first skin and the first stiffening member may be formed via twin sheet forming or stamp forming, in accordance with various embodiments. The method 500 further includes repeating step 510 for the second skin and the second stiffening member (step 512). The method 500 further includes assembling the combined first skin and first stiffening member and the combined second skin and second stiffening member (step 514). The method further includes bonding the combined first skin and first stiffening member and the combined second skin and second stiffening member (step 516).

Figure 6A:
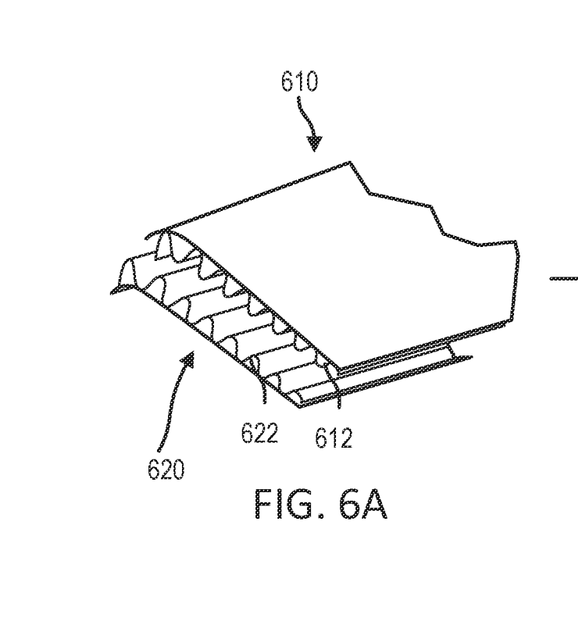
FIG. 6A illustrates forming a stiffened structure in accordance with the method from FIG. 5, in accordance with various embodiments.
Figure 6B:
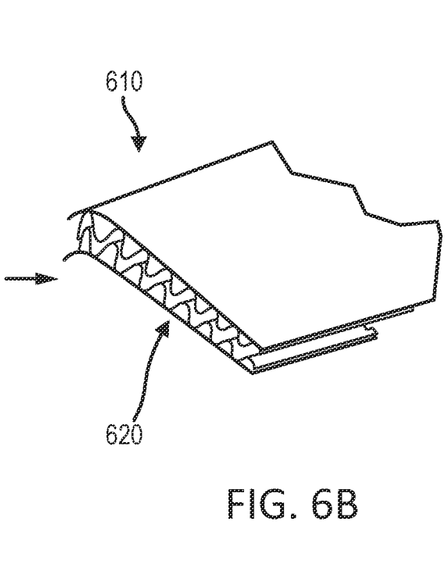
FIG. 6B illustrates forming a stiffened structure in accordance with the method from FIG. 5, in accordance with various embodiments.
Figure 6C:
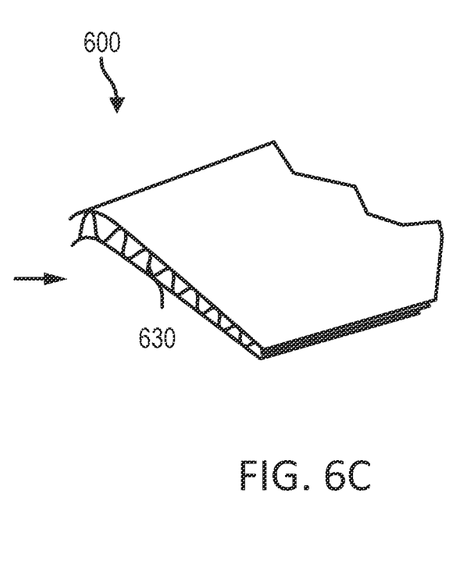
FIG. 6C illustrates forming a stiffened structure in accordance with the method from FIG. 5, in accordance with various embodiments.

Referring now to FIG. 6A, a combined first skin and stiffening member 610 and a combined second skin and stiffening member 620 are illustrated after step 512 of method 500 from FIG. 5 in accordance with various embodiments. In various embodiments, the first stiffening member 612 of the combined first skin and stiffening member 610 may be complimentary in shape to the second stiffening member 622 of the combined second skin and stiffening member 620. In this regard, with reference now to FIGS. 6B and 6C, the combined first skin and stiffening member 610 and the combined second skin and stiffening member 620 may be assembled together while still in a heated state in accordance with step 514 of method 500 and bonded together by via cooling and consolidation to form the stiffening member 630 of the control surface 600 as described previously herein in accordance with step 516 of method 500. In this regard, the first stiffening member 612 and the second stiffening member 622 may provide a long length to bond the reinforced thermoplastic sheets in accordance with various embodiments. In various embodiments, method 500 would facilitate no tooling in steps 514 and 516, in accordance with various embodiments. Additionally, the first stiffening member 612 and the second stiffening member 622 may be very thin (i.e., a single ply of a fiber-reinforced thermoplastic sheet (e.g., fiber-reinforced thermoplastic sheet 301).

In various embodiments, the methods and stiffened structures disclosed herein include a novel stiffening shape for efficient forming and stiffening in aerospace application. In various embodiments, the stiffened structures 110, 120, 400, 600 disclosed herein may combat skin buckling which may lead to thicker skins or additional stiffeners in other stiffening structure designs. In various embodiments, the methods of manufacture disclosed herein are fast and cost effective relative to typical methods.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a fiber-reinforced thermoplastic control surface, comprising:
   stacking plies of thermoplastic composite sheets to a first desired thickness to form a first skin;
   stacking plies of thermoplastic composite sheets to a second desired thickness to form a second skin;
   forming the first skin in a first contour;
   forming the second skin in a second contour;
   forming a stiffening member including a thermoplastic resin, the stiffening member including a cross-sectional shape having a plurality of peaks and troughs, the cross-sectional shape defining a sinusoidal wave with a varying amplitude;
   assembling the stiffening member between the first skin and the second skin; and
   joining the stiffening member to the first skin and the second skin.

2. The method of claim 1, wherein forming the first skin, forming the second skin, and forming the stiffening member are each performed via stamp forming.

3. The method of claim 1, wherein forming the first skin, forming the second skin, and forming the stiffening member are each performed via twin sheet forming.

4. The method of claim 1, wherein forming the first skin, forming the second skin, and forming the stiffening member are each performed via automated fiber placement.

5. The method of claim 1, wherein the plurality of peaks are joined to and mate with the first skin, and wherein the plurality of troughs mate with and are joined to the second skin.

6. The method of claim 1, wherein an outer surface of the first skin defines a structure of an aircraft component.

7. The method of claim 1, wherein the first skin includes an outer surface that defines a control surface, and the second skin includes an inner surface at least partially defining a hollow chamber of an airfoil.

8. A method for forming a fiber-reinforced thermoplastic control surface, comprising:
   forming a combined first skin and first stiffening member by joining a first skin to a plurality of peaks of the first stiffening member;
   forming a combined second skin and second stiffening member by joining a second skin to a plurality of troughs of the second stiffening member;
   bonding the combined first skin and the first stiffening member to the combined second skin and the second stiffening member; and
   in response to bonding the combined first skin and the first stiffening member to the combined second skin and the second stiffening member, forming a stiffening member of the fiber-reinforced thermoplastic control surface, the stiffening member comprising a cross-secitonal shape defining a sinusoidal wave with a varying amplitude.

9. The method of claim 8, wherein joining the combined first skin and stiffening member and the combined second skin and the second stiffening member includes joining the first stiffening member to the second stiffening member, and wherein the first stiffening member and the second stiffening member are joining along a contour of the first stiffening member and the second stiffening member.

10. The method of claim 8, wherein forming the combined first skin and the first stiffening member and forming the combined second skin and the second stiffening member each comprise stamp forming.

11. The method of claim 8, wherein forming the combined first skin and the first stiffening member and forming the combined second skin and the second stiffening member each comprise twin sheet forming.

12. The method of claim 8, wherein forming the combined first skin and the first stiffening member and forming the combined second skin and the second stiffening member each comprise automated fiber placement.

13. The method of claim 8, further comprising stacking plies of thermoplastic composite sheets to a first desired thickness to form the first skin and stacking plies of thermoplastic composite sheets to a second desired thickness to form the second skin.

14. The method of claim 8, wherein joining includes consolidation and cooling.

15. The method of claim 8, wherein joining includes welding.

* * * * *

UNITED STATES PATENT AND TRADEMARK OFFICE
CERTIFICATE OF CORRECTION

| | | |
|---|---|---|
| PATENT NO. | : 11,780,179 B2 | |
| APPLICATION NO. | : 17/464997 | |
| DATED | : October 10, 2023 | |
| INVENTOR(S) | : Jennifer Davis et al. | |

It is certified that error appears in the above-identified patent and that said Letters Patent is hereby corrected as shown below:

In the Claims

Claim 1, Column 9, Line 27: after the phrase "defining a" please insert the word --continuous--

Claim 1, Column 9, Line 28: after the word "amplitude" please insert the word --subsequently--

Claim 1, Column 9, Line 29: after the word "assembling" please insert the word --only--

Claim 1, Column 9, Line 32: after the phrase "...the second skin" please insert the phrase --to form the fiber-reinforced thermoplastic control surface, the cross-sectional shape extending in a spanwise direction along the reinforced thermoplastic control surface.--

Claim 8, Column 10, Line 13: after the phrase "stiffening member" please insert the phrase --, wherein each peak in the plurality of peaks of the first stiffening member is bonded to a respective trough in the plurality of troughs of the second stiffening member--

Claim 8, Column 10, Line 18: please delete the word "cross-secitonal" and insert with the word --cross-sectional--

Claim 8, Column 10, Line 19: after the phrase "varying amplitude" please insert the phrase --the cross-sectional shape extending in a spanwise direction along the reinforced thermoplastic control surface--

Signed and Sealed this
Twenty-seventh Day of February, 2024

Katherine Kelly Vidal
*Director of the United States Patent and Trademark Office*